United States Patent [19]

Kawai et al.

[11] Patent Number: 5,654,380
[45] Date of Patent: Aug. 5, 1997

[54] ALIPHATIC POLYESTER CARBONATE AND PROCESS FOR PRODUCING THE SAME

[75] Inventors: Ryozo Kawai; Mitsuo Miura; Kyohei Takakuwa; Yoshinori Isahaya; Takayasu Fujimori; Jiro Suito; Makoto Nakamura, all of Tsukuba, Japan

[73] Assignee: Mitsubishi Gas Chemical Company, Inc., Tokyo, Japan

[21] Appl. No.: 443,485

[22] Filed: May 18, 1995

[30] Foreign Application Priority Data

| | | | |
|---|---|---|---|
| May 23, 1994 | [JP] | Japan | 6-108421 |
| Jul. 28, 1994 | [JP] | Japan | 6-176681 |
| Jul. 28, 1994 | [JP] | Japan | 6-176682 |
| Nov. 16, 1994 | [JP] | Japan | 6-281773 |
| Nov. 16, 1994 | [JP] | Japan | 6-281774 |

[51] Int. Cl.$^6$ .................................................. C08F 20/00
[52] U.S. Cl. .................. 525/439; 528/272; 528/275; 528/277; 528/279; 528/281; 528/283; 528/287
[58] Field of Search ................................ 528/272, 275, 528/277, 279, 281, 283, 287; 525/439

[56] References Cited

U.S. PATENT DOCUMENTS

| | | | |
|---|---|---|---|
| 4,533,728 | 8/1985 | Waniczek et al. | 528/370 |
| 5,294,729 | 3/1994 | Wicks et al. | 558/268 |

FOREIGN PATENT DOCUMENTS

| | | |
|---|---|---|
| 0 000 510 | 2/1979 | European Pat. Off. . |
| 0 131 164 | 1/1985 | European Pat. Off. . |
| 0 431 977 | 6/1991 | European Pat. Off. . |
| 0 496 404 | 7/1992 | European Pat. Off. . |
| 0 534 189 | 3/1993 | European Pat. Off. . |
| 0 561 224 | 9/1993 | European Pat. Off. . |
| 1 807 096 | 10/1969 | Germany . |

OTHER PUBLICATIONS

Patent Abstracts of Japan, publication No. JP7053693, "Aliphatic Polyester Carbonate", Mitsuo et al., Feb. 28, 1995, vol. 950, No. 2, Int. Cl. C08G63/64 and Chemical Abstracts, vol. 123, No. 16, 16 Oct. 1995, Abstract No. 199763.

*Primary Examiner*—Samuel A. Acquah
*Attorney, Agent, or Firm*—Armstrong, Westerman, Hattori, McLeland & Naughton

[57] ABSTRACT

Provided are an aliphatic polyester carbonate having biodegradability and having a content of carbonate unit of at least 5 mol %, a weight-average molecular weight of at least 100,000, a melt viscosity of 2,000–50,000 poises at 190° C. and under a load of 60 kg and a melting point of 70°–180° C., and a process for producing said aliphatic polyester carbonate which comprises reacting an aliphatic dihydroxy compound with an aliphatic dibasic acid in the presence of an ester exchange catalyst to obtain an oligomer and then reacting the oligomer with a diaryl carbonate in the presence of the ester exchange catalyst. A phosphorus compound may be added to the aliphatic polyester carbonate for the purpose of stabilization.

8 Claims, No Drawings

ALIPHATIC POLYESTER CARBONATE AND PROCESS FOR PRODUCING THE SAME

FIELD OF THE INVENTION

The present invention relates to high molecular weight aliphatic polyester carbonates having biodegradability and in particular to high molecular weight aliphatic polyester carbonates having biodegradability which are excellent in heat stability at processing and suitable to be molded into films, sheets, filaments, foams and others and to a process for producing the same.

The aliphatic polyester carbonates of the present invention are excellent in fluidity and injection moldability and suitable for obtaining molded products such as films, sheets and fibers. The resulting molded products have mechanical strength and show high biodegradability in soil or activated sludge process and can be widely utilized for making wrapping materials and moldings. For example, they can be utilized for multifilms which cover the surface of soil for the heat insulation, pots and strings for affore-station and coating materials for fertilizers in the field of agriculture; fishing lines and fishing nets in the field of fishery; and medical materials and hygienic materials such as sanitary napkins in the medical field.

BACKGROUND OF THE INVENTION

Recently, development of polymer materials which decompose in the natural environment has been desired in view of the worldwide problems of environmental protection. Especially, plastics which are decomposed by microorganisms are greatly expected in the industries as environmentally adaptable materials or functional materials of new type.

It has been well known that aliphatic polyesters have biodegradability and representative are poly-3-hydroxybutyrates (PHB) which are produced by microorganisms and polycaprolactones (PCL) which are synthetic polymers. Biopolyesters mainly composed of PHB have excellent environmental adaptability, but are poor in productivity and have a limit to be substituted for general-purpose plastics. As for PCL, those of high polymerization degree capable of being molded into films have been obtained, but they have a melting point lower than 65° C. and are inferior in heat resistance and cannot be applied to wide uses.

Furthermore, it is known, for example, in "Polym. Sci. Technol.", Vol.3, Page 61 (1973) that aliphatic polyesters obtained from aliphatic dibasic acids and aliphatic dihydroxy compounds have biodegradability. However, these polymers are poor in heat stability and in addition, accompany decomposition reaction at the time of polycondensation and hence, only those of about 10000 in number-average molecular weight can be obtained.

JP 4-189822A, U.S. Pat. No. 5,310,782 and EP (A1) 0572,256 report that aliphatic polyesters are treated with diisocyanates such as hexamethylene diisocyanate to increase the molecular weight thereof. These polyesters are polyester urethanes containing urethane bond formed by diisocyanates and crosslinkage in the molecules and they are insufficient in biodegradability and have a problem in appearance when molded into films.

It is known that as polyester carbonates obtained using aliphatic compounds, those which are obtained using alicyclic compounds or aromatic compounds and aliphatic compounds can be used in the form of molded articles since normally they have a high melting point or a high glass transition point. However, they are very poor in degradability with microorganisms or do not show biodegradability.

Only the aliphatic polyester carbonates obtained by ring opening polymerization using cyclic monomers are classified in biodegradable polymers. These comprise a hydroxycarboxylic acid unit and an aliphatic carbonate unit as constitutive elements and have compatibility with living body and are usable in medical field, but since they have hydrolyzability, there is a limit in using them as films, sheets or molded articles.

On the other hand, it is known to produce polyester carbonates from aliphatic dibasic acids, aliphatic dihydroxy compounds and diaryl carbonates. For example, JP 60-13811A discloses a process for producing aliphatic polyester carbonates from low-molecular weight polyester diols or polyether diols and diphenyl carbonate. However, the resulting aliphatic polyester carbonates are rubbery and soluble in tetrahydrofuran at room temperature and it is merely shown that they can be used as additives to plastics.

The aliphatic polyester carbonates composed of aliphatic dibasic acids and aliphatic dihydroxy compounds are generally low in melting point, have rubber-like properties and inferior in heat resistance and solvent resistance. Such aliphatic polyester carbonates are mainly used for starting materials for urethane as liquid low-molecular weight compounds and at present, they are utilized, for example, as adhesives, sealing agents, coating agents and additives to other resins and have never been practically used as molded articles such as films, sheets and fibers. Furthermore, it has not been known to use them as biodegradable polymers required to have practical general-purpose properties.

SUMMARY OF THE INVENTION

An object of the present invention is to provide an aliphatic polyester carbonate having a high molecular weight and a high melting point sufficient for practical use and having moldability, heat resistance, solvent resistance and mechanical strength.

Another object of the present invention is to provide a biodegradable aliphatic polyester carbonate having a high molecular weight sufficient for practical use and excellent in solvent resistance and heat stability.

Further another object is to provide a high-molecular weight aliphatic polyester carbonate having biodegradability which is obtained from aliphatic dibasic acids, aliphatic dihydroxy compounds and diaryl carbonates and a process for producing the same.

As a result of intensive research conducted by the inventors, it has been found that aliphatic polyester carbonates having a high molecular weight and high melting point sufficient for practical use and having moldability, heat resistance, solvent resistance and mechanical strength can be obtained by reacting an aliphatic dibasic acid mainly composed of succinic acid with an aliphatic dihydroxy compound mainly composed of 1,4-butanediol and then reacting the resulting oligomer with a diaryl carbonate with using a specific compound as an ester exchange catalyst and with acid value of the oligomer being specified in a specific range and amount of the residual dihydroxy compound in the oligomer being specified in a specific range and that the resulting aliphatic polyester carbonates have improved biodegradability due to the presence of carbonate unit and can be applied to the uses which require biodegradability. It has been further found that heat stability of the resulting polyester carbonates can be further improved by adding thereto a phosphorus compound. Thus, the present invention has been accomplished.

That is, the present invention relates to an aliphatic polyester carbonate having biodegradability and having a content of carbonate unit of at least 5 mol %, a weight-average molecular weight of at least 100,000, a melt viscosity of 2,000–50,000 poises at 190° C. and under a load of 60 kg and a melting point of 70°–180° C. which is obtainable by reacting, in the presence of an ester exchange catalyst, a diaryl carbonate with an aliphatic polyester oligomer having a number-average molecular weight of 10,000 or less obtained by reacting an aliphatic dihydroxy compound mainly composed of 1,4-butanediol with an aliphatic dibasic acid mainly composed of succinic acid in the presence of said ester exchange catalyst, and to a process for producing the aliphatic polyester carbonate.

The present invention further relates to a high-molecular weight aliphatic polyester carbonate composition having biodegradability and having solvent resistance and excellent heat stability which is obtainable by adding 0.0005–0.01 part by weight of a phosphorus compound to 100 parts by weight of an aliphatic polyester carbonate having a content of carbonate unit of at least 5 mol %, a weight-average molecular weight of at least 100,000, a melt viscosity of 2,000–50,000 poises measured by a flow tester at 190° C. and under a load of 60 kg and a melting point of 70°–180° C., said aliphatic polyester carbonate being obtainable by reacting an aliphatic dihydroxy compound mainly composed of 1,4-butanediol with an aliphatic dibasic acid mainly composed of succinic acid in the presence of an ester exchange catalyst to obtain an aliphatic polyester oligomer and then reacting the oligomer with a diaryl carbonate in the presence of said ester exchange catalyst, and to a process for producing the composition.

The production of the aliphatic polyester carbonate according to the present invention comprises the first step of obtaining an aliphatic polyester oligomer from an aliphatic dihydroxy compound and an aliphatic dibasic acid and the second step of obtaining the aliphatic polyester carbonate by reacting said aliphatic polyester oligomer with a diaryl carbonate.

The first step is of producing a polyester oligomer having a number-average molecular weight of 10,000 or less, usually 500–10,000 at a temperature of 100°–250° C., preferably 150°–220° C. in the presence of a catalyst while removing the by-product water produced in the reaction and excess dihydroxy compound. When the molecular weight of the polyester oligomer is larger than the above range in this first step, the content of carbonate unit in the final polymer is very low to cause deterioration of biodegradability and it is not preferred that the molecular weight exceeds the above range. When the molecular weight of the polyester oligomer is smaller than 500, melting point of the final polymer decreases and practically usable polymers cannot be obtained.

However, the polyester oligomer can be one which has a molecular weight exceeding the above range when used in the field where especially severe biodegradability is not demanded.

The first step is carried out at a reaction temperature of 100°–250° C. and finally, under reduced pressure because it is necessary to remove excess dihydroxy compound and the by-products water or alcohols produced in the reaction of the aliphatic dibasic acid and the aliphatic dihydroxy compound. Pressure can be selected so as to attain the objects and usually a reduced pressure of lower than 300 mmHg is preferred for the purpose of accelaration of reaction.

The reaction between the aliphatic dibasic acid and the aliphatic dihydroxy compound in this step is carried out using the aliphatic dihydroxy compound in excess of stoichiometric amount in respect to the aliphatic dibasic acid. Specifically, the aliphatic dihydroxy compound is used in an amount of 1.05–2.00 mols per 1 mol of the dibasic acid.

Molecular weight and acid value of the aliphatic polyester oligomer and residual amount of the dihydroxy compound can be controlled by suitably balancing the distillation rate of unreacted dihydroxy compound and the reaction rate. A method of optionally selecting and combining the conditions of charging molar ratio, catalyst, temperature, degree of reduction of pressure and reaction time and a method of introducing an inert gas at a suitable flow rate can be employed as practical methods.

Usually, it can be carried out by adjusting stepwise the degree of reduction of pressure at a reaction temperature of 100°–250° C. in the presence of a catalyst. For example, first the esterification is carried out under atmospheric pressures and water produced by condensation is removed and subsequently, dehydration condensation reaction is further carried out at a reduced pressure of about 200–80 mmHg to lower the acid value and finally, the pressure is reduced to a degree of vacuum of less than 5 mmHg.

Shortening of the reaction time and reduction of the residual amount of the dihydroxy compound in the oligomer can be performed by increasing the rate of distilling off of excess dihydroxy compound and the rate of increase of the degree of reduction of pressure, but in this case, it is necessary to take care that the reaction is completed to reduce amount of unreacted carboxylic acid, namely, acid value. In the production of aliphatic polyester carbonates of the present invention, acid value of the oligomer is preferably 2.50 KOH mg/g or less, more preferably 1.50 KOH mg/g or less. Increase of the acid value is not preferred in view of the problems such as decomposition and coloration of the final products caused by the side reaction of the diaryl carbonate.

The molecular weight of the aliphatic polyester oligomer can be adjusted by the amount of distillation of the dihydroxy compound which occurs with the reaction of removal of glycol and it is desirable that amount of free dihydroxy compound in the oligomer be smaller for control of the reaction in the second step. When amount of the free dihydroxy compound is large, there is the possibility of occurrence of undesirable side reactions such as reaction with diaryl carbonate to produce cyclic carbonates, self-reaction of one molecule of the dihydroxy compound to produce cyclic ethers and reaction of two molecules of the dihydroxy compound to produce chain ethers and decomposition of diaryl carbonate caused by water produced by these reactions.

Therefore, for producing the aliphatic polyester carbonate of the present invention, amount of the free dihydroxy compound in the polyester oligomer obtained in the first step is preferably controlled to 2.0% (wt/wt) or less and terminal hydroxyl value is preferably in the range of 20–200 KOH mg/g.

The second step is a step where the polyester oligomer obtained in the first step is reacted with a diaryl carbonate to prepare a polymer and this step is carried out usually at 150°–250° C., preferably at 200°–220° C. in the presence of a catalyst, the by-product phenol produced in the reaction being removed. At a temperature lower than 150° C., a sufficient reaction rate cannot be obtained and at a temperature higher than 250° C., the polymerization reaction can rapidly proceed, but the resulting polymer is sometimes colored and this is not preferred. The reaction is preferably carried out with gradually adjusting the degree of reduction of pressure to reach finally a reduced pressure of 3 mmHg or lower.

An explanation will be given on an example where 1,4-butanediol is used as the aliphatic dihydroxy compound, succinic acid is used as the aliphatic dicarboxylic acid component and diphenyl carbonate is used as the diaryl carbonate.

At the first step, succinic acid and 1,4-butanediol in an amount of 1.05–2.0 mols per mol of succinic acid are heated together with a catalyst at 100°–200° C. under atmospheric pressure and water produced by the condensation is removed. Then, a dehydration condensation reaction is carried out at 180°–220° C. under a reduced pressure of 200–80 mmHg and finally, the pressure is reduced to a degree of vacuum of 5 mmHg or lower to remove 1,4-butanediol to attain the desired molecular weight. The reaction time may vary depending on the molecular weight, but is preferably about 5–12 hours.

At the second step, to the resulting aliphatic polyester oligomer are added diphenyl carbonate in an amount of 0.4–0.6 mol per mol of hydroxyl group of the oligomer and optionally a catalyst, and the by-product phenol is removed at 150°–250° C. under a reduced pressure of 200–1 mmHg. The reaction time may vary depending on the desired molecular weight, but is preferably about 4–8 hours.

Content of carbonate unit in the aliphatic polyester carbonate can be made to the desired value by controlling the amount of terminal hydroxyl group of the aliphatic polyester oligomer. If content of the carbonate unit is too large, the melting point of the resulting aliphatic polyester carbonate lowers and polymers having a practical heat resistance cannot be obtained. On the other hand, when the content of carbonate unit increases, the biodegradability by microorganisms increases. Therefore, content of the carbonate unit is preferably such as giving a proper biodegradability and realizing practical heat resistance. Thus, content of the carbonate unit in the aliphatic polyester carbonate is preferably 1–30 mol %, especially 5–25 mol %.

Examples of the aliphatic dihydroxy compound used for production of the aliphatic polyester carbonate of the present invention are ethylene glycol, trimethylene glycol, propylene glycol, 1,3 and 1,4-butanediols, pentanediol, hexanediol, neopentyl glycol and cyclohexanediol.

Examples of the aliphatic dibasic acid used for production of the aliphatic polyester carbonate of the present invention are snccinic acid, malonic acid, glutaric acid, adipic acid and azelaic acid, and esters or acid anhydrides thereof may also be used. The aliphatic dihydroxy compound and aliphatic dibasic acid can be used alone or as a mixture, respectively, and they can be used in desired combination, respectively. However, those of high melting point are preferred in order to obtain products having a proper biodegradability and a practical heat resistance. Accordingly, it is preferred to use a dibasic acid containing at least 60% of succinic acid and an aliphatic dihydroxy compound containing at least 60% of 1,4-butanediol. The dibasic acid containing at least 60% of succinic acid and aliphatic dihydroxy compound containing at least 60% of 1,4-butanediol are hereinafter sometimes referred to as "dibasic acid mainly composed of succinic acid" and "aliphatic dihydroxy compound mainly composed of 1,4-butanediol", respectively.

Examples of the diaryl carbonate used for production of the aliphatic polyester carbonate of the present invention are diphenyl carbonate, ditolyl carbonate, bis(chlorophenyl) carbonate and m-cresyl carbonate.

Diphenyl carbonate is especially preferred. The diaryl carbonate is used in an amount of 0.40–0.60 mol, more preferably 0.45–0.55 mol, especially preferably 0.47–0.52 mol per mol of the terminal hydroxyl group of the aliphatic polyester oligomer.

The catalysts used in the present invention are selected from ester exchange catalysts. Especially preferred are composite catalysts comprising combinations of a zirconium compound or hafnium compound with at least one compound of Y, La, Zn and Sn compounds and they are used in an amount of preferably $5 \times 10^{-5}$ to 1 part by weight for 100 parts by weight of the starting material mixture. The preferred form of the catalyst is fatty acid salt, hydroxide, alcoholate, phenolate, acetylacetonate or the like.

Examples of the zirconium compound and hafnium compound are zirconium acetylacetonate, acetylacetatozirconyl, zirconium tetraethoxide, zirconium tetraisopropoxide, zirconium tetra-n-butoxide, zirconium tetra-tert-butoxide, zirconyl chloride, zirconium chloride, zirconium sulfate, zirconium oxyacetate, zirconium octanoate, zirconium oxystearate, hafnium acetylacetonate, hafnium tetrabutoxide and hafnium tetraisopropoxide. Especially preferred are zirconium acetylacetonate and hafnium acetylacetonate.

Examples of the compounds of Y, La, Zn or Sn are yttrium acetate, yttrium naphthenate, tris-(acetylacetonato)yttrium, lanthanum acetate, zinc acetate, zinc acetylacetonate, zinc benzoate, zinc stearate, zinc oxide, zinc phosphate, tin oxalate, tin acetylacetonate, dibutyltin oxide and tin chloride. Especially preferred are zinc acetylacetonate, zinc acetate and dibutyltin oxide.

By using the composite catalyst comprising zirconium compound or hafnium compound and a compound of Y, La, Zn or Sn as the ester exchange catalyst, a sufficient reaction rate can be obtained even with a small total amount of the catalysts. Especially, it is an advantage that the polymerization reaction at the second step can be performed in a short time.

As for the time when the catalyst is added, the zirconium compound or hafnium compound and at least one compound selected from the compounds of Y, La, Zn and Sn may be added simultaneously and from the first, namely, they may be used from the start of reaction at the first step. Alternatively, the ziconium compound or hafnium compound may be used in the reaction of the first step, namely, synthesis reaction of oligomer and at least one of the compounds of Y, La, Zn and Sn, for example, a zinc compound or a tin compound may be used in the reaction at the second step.

Since the catalyst used remains in the polymer after completion of the polymerization reaction, when amount of the catalyst is too excessive, heat stability of the polymer is damaged and when it is too small, a long time is required for production of oligomer and completion of the polymerization reaction. Furthermore, amount of metals resulting from the remaining catalyst is desired to be as little as possible, for example, in the case of using the polymer as wrapping materials used for wrapping of foods. Considering these points, amount of the catalyst is usually $5 \times 10^{-5}$ to 1 part by weight, preferably $1 \times 10^{-4}$ to $2 \times 10^{-2}$ part by weight for 100 parts by weight of the mixture of the starting materials.

The thus obtained aliphatic polyester carbonate per se has a practically sufficient heat stability, but in some case, a long time is required for discharging the resin from the reaction vessel or decrease of molecular weight or coloration may occur when molding is carried out at high temperatures.

It is one of the characteristics of the present invention that the heat stability of the aliphatic polyester carbonate can further be improved by adding a phosphorus compound to the polyester carbonate after completion of the polymerization reaction. Furthermore, addition of the phosphorus compound results in the effect to inhibit the coloration. The addition and mixing of phosphorus compound may be carried out in the reaction vessel subsequent to completion of the polymerization reaction. Alternatively, the polymer is discharged from the reaction tank and then, is mixed with the phosphorus compound in a separate mixing tank or by known apparatuses such as a twin-screw extruder.

As examples of the phosphorus compound, mention may be made of phosphites and phosphates such as tris(2,4-di-tert-butylphenyl) phosphite, tris(nonylphenyl) phosphite, trilauryl phosphite, triphenyl phosphite, distearylpentaerythritol diphosphite, bis(2,4-di-tert-butylphenyl)pentaerythritol diphosphite, 4,4'-butylidenebis(3-methyl-6-t-butylphenyl-di-tridecyl phosphite) and 4,4'-isopropylidenediphenolalkyl ($C_{12}$–$C_{15}$) phosphites, trimethyl phosphate, tributyl phosphate and dibutylbutyl phosphate, and inorganic phosphorus compounds such as phosphoric acid, phosphorous acid and polyphosphoric acid. Especially preferred are phosphoric acid, phosphorous acid and polyphosphoric acid. Phosphoric acid is somewhat inferior to phosphorous acid and polyphosphoric acid in heat stabilizing effect at high temperatures and phosphorous acid has deliquescent property and has a problem in operability, and thus, polyphosphoric acid is especially preferred.

Amount of the phosphorus compound is 0.0005–0.01 part by weight for 100 parts by weight of the aliphatic polyester carbonate. If amount of the phosphorus compound is less than 0.0005 part by weight, sufficient stabilizing effect cannot be obtained at the time of heating and if it is more than 0.01 part by weight, the heat stability is rather damaged. Furthermore, a known antioxidant may be added to the aliphatic polyester carbonate simultaneously with addition of the phosphorus compound. Examples of the antioxidant are hindered phenol type antioxidants.

The aliphatic polyester carbonate of the present invention contains at least 5 mol % of carbonate unit and has a weight-average molecular weight (Mw) of 100,000 or more, usually 100,000–250,000, a melt viscosity of 2,000–50,000 poises at 190° C. and under a load of 60 kg, and a melting point of 70°–180° C. The weight-average molecular weight (Mw) is measured by gel permeation chromatography (GPC). If the weight-average molecular weight (Mw) is less than 100,000, a sufficient strength cannot be obtained and if it is more than 250,000, melt viscosity of the resin at molding is high and this is not preferred. Content of the carbonate unit is preferably 5 mol % or more from the point of biodegradability.

The aliphatic polyester carbonate of the present invention can be subjected to injection molding and extrusion molding, and filaments, blow molded articles, foam molded articles and others can be obtained. It is also possible to produce a tough film or sheet by the molding methods known per se such as inflation method and T-die method. The resulting unstretched products can be made to stretched films by uniaxial stretching or biaxial stretching. In carrying out these molding methods, if necessary, known lubricants, waxes, colorants, fillers and others can be used.

When molded articles are produced from the aliphatic polyester carbonate of the present invention, molecular weight of the polymer used can be optionally selected depending on the molding conditions, kind of molded articles, molding temperature and the like. Except for special cases, an Mw in the range of 120,000–170,000 suffices for injection molding. For the production of inflation films, polymers of relatively high molecular weight are preferred for stabilization of molding and for obtaining a sufficient film strength and those of Mw 150,000–230,000 are preferred.

Furthermore, the aliphatic polyester carbonate of the present invention has a melt viscosity of 2,000–50,000 poises. This melt viscosity is measured by a flow tester at 190° C. and under a load of 60 kg. If the melt viscosity is lower than 2,000 poises, the resin flows too much and cannot be stably molded. If it is higher than 50,000 poises, a sufficient fluidity cannot be obtained and molding of the resin becomes difficult. Therefore, a melt viscosity of 2,000–50,000 poises is preferred. Especially, in order to prepare a uniform film of good quality by film molding, a melt viscosity of 5,000–30,000 is preferred.

Moreover, molding temperature is important for obtaining stable molding conditions with a proper melt viscosity of resin. Cylinder temperature and die temperature of extruder are preferably 120°–240° C., more preferably 130°–220° C. If the temperatures are lower than 120° C., the viscosity is too high and if they are higher than 240° C., the resin deteriorates and molded articles of good quality cannot be obtained.

For example, an unstretched film prepared using an aliphatic polyester carbonate of the present invention having a melt viscosity of 5,000–30,000 poises at 190° C. and under a load of 60 kg by T-die method at 130°–200° C. has a modulus of elasticity of 0.1 gigapascal (GPa) or higher and an elongation of 400% or more.

The aliphatic polyester carbonate of the present invention is a highly crystalline polymer having a melting point of 70°–180° C. and has the excellent solvent resistance that it dissolves in chloroform and methylene chloride, but does not dissolve in most of alcohols, ketones, ethers, esters and aliphatic and aromatic hydrocarbons such as tetrahydrofuran, methanol, acetone, ethyl acetate, diethyl ether, hexane, toluene and xylene.

The biodegradability is affected by molecular weight and content of carbonate unit, but when the resulting film is subjected to a soil burial test under the conditions of 25° C., 60% RH, the aliphatic polyester carbonate having a content of carbonate unit of at least 5 mol % even when it has a high molecular weight shows higher degradability as compared with aliphatic polyesters having no carbonate unit. If the content of carbonate unit in the polymer is higher than 7.0 mol %, the polymer degrades more than half in 18 weeks and the polymer containing more than 20.0 mol % of carbonate unit completely disappears in 15 weeks. This is a degradability of more than 5 times that of aliphatic polyesters having no carbonate unit.

As explained above, according to the present invention, aliphatic polyester carbonates having heat resistance and solvent resistance and a high molecular weight sufficient for practical use can be produced. Moreover, heat stability of said aliphatic polyester carbonates can be improved by adding a phosphorus compound thereto. In addition, the aliphatic polyester carbonates of the present invention are excellent in biodegradability. The biodegradability can be enhanced with increase in the content of carbonate unit and the biodegradation rate in environment, for example, in soil can be optionally selected by the content of carbonate unit.

The present invention will be explained in more detail by the following examples.

In the Examples, the melting point was measured by DSC (SSC 5000 manufactured by Seiko Electron Co., Ltd.). The molecular weight (Mw and Mn determined according to a calibration curve which had been drawn by using polystyrene as a standard) was measured by GPC (GPC System-11 manufactured by Showa Denko Co., Ltd.) using chloroform as a solvent. The content of carbonate unit was measured by NMR (NMR EX-270 manufactured by Japan Electron Co., Ltd.) as a proportion (mol %) of the carbonate unit in the total of dicarboxylate ester unit and carbonate unit in accordance with $^{13}$CNMR. The melt viscosity was measured by a flow tester (CFT-500C manufactured by Shimadzu Seisakusho Ltd.) at 190° C. and under a load of 60 kg. The amount of 1,4-butanediol remaining in the polyester oligomer was determined by a gas chromatograph provided with TCD detector (GC-14B manufactured by Shimadzu Seisakusho Ltd.). The hydroxyl value and acid value of the polyester oligomer were measured in accordance with JIS K-1557. From the measured hydroxyl value, the mol number of terminal hydroxyl group per unit weight was obtained and ½ thereof was employed as a stoichiometric amount of the diaryl carbonate. Properties of the film obtained were measured in accordance with JIS Z-1707.

EXAMPLE 1

In a 50 liter reactor equipped with a stirrer, a fractionating condenser, a thermometer and a gas introduction pipe were charged 18740 g (158.7 mols) of succinic acid, 21430 g (237.8 mols) of 1,4-butanediol and 745 mg of zirconium acetylacetonate and reaction was carried out under a nitrogen atmosphere at 150°–220° C. for 2 hours and water was distilled off. Subsequently, aging was carried out for 3 hours under a reduced pressure of 150–80 mmHg to allow a dehydration reaction to proceed. Furthermore, the degree of reduction of pressure was gradually increased so as to reach finally a reduced pressure of 2 mmHg or lower to further distill off water and 1,4-butanediol. When the total distillation amount reached 10460 g, the reaction was stopped. The resulting oligomer had a number-average molecular weight of 1780, a terminal hydroxyl value of 102 KOH mg/g and an acid value of 0.51 KOH mg/g. Amount of 1,4-butanediol remaining in the oligomer was 0.50% by weight.

Then, 24000 g of the resulting oligomer was charged in a 50 liter reactor equipped with a stirrer, a fractionating condenser, a thermometer and a gas introduction pipe and 4680 g of diphenyl carbonate and 1.40 g of zinc acetate were added thereto. Reaction was carried out at 210°–220° C. for 5 hours under a reduced pressure of finally 1 mmHg. The obtained polymer (A-1) had a melting point of 104° C. and a weight-average molecular weight (Mw) of 188000 measured by GPC and contained 14.3% of carbonate bond as the polycarbonate unit measured in accordance with $^{13}$CNMR. Loss of diphenyl carbonate was 3.2% by weight. The polymer completely dissolved in chloroform and contained no gel component. It did not dissolve at all in tetrahydrofuran.

The resultant pellets (A-1) were dried at 90° C. for 10 hours by a vacuum drier, fed to an extruder with a hopper drier (screw diameter 20 mmφ, L/D=25), and extruded through a T-die of 200 mm in width fitted to the extruder at 185° C. to prepare a film of 50 μm thick. When the film was prepared continuously for 4 hours, the film was somewhat colored, but the coloration was such as to cause no practical problems. Properties of the resulting unstretched film are shown in Table 1.

The pellets adjusted to a water content of 1000 ppm were kept at 190° C. for 5 minutes and 30 minutes in a heating cylinder and then, melt viscosity was measured by a flow tester to obtain 9,900 poises and 9,100 poises, respectively. Increase of coloration due to residence and some decrease of molecular weight were seen, but these were such as causing no practical problems.

EXAMPLE 2

100 parts by weight of the polyester carbonate (A-1) obtained in Example 1 and 0.003 part by weight of phosphoric acid were extruded by a twin-screw extruder at a resin temperature of 190° C. to prepare pellets.

The resulting pellets (B-1) were dried at 90° C. for 10 hours by a vacuum drier, fed to an extruder with a hopper drier (screw diameter 20 mmφ, L/D=25), and extruded through a T-die of 200 mm in width fitted to the extruder at 185° C. to prepare a film of 50 82 m thick. When the film was prepared continuously for 4 hours, no coloration of the film was seen.

The pellets adjusted to a water content of 1000 ppm were kept at 190° C. for 5 minutes and 30 minutes in a heating cylinder and then, melt viscosity was measured by a flow tester to obtain 9,800 poises and 9,600 poises, respectively. Substantially no increase of coloration due to residence and substantially no decrease of molecular weight were seen. Thus, it can be seen that the phosphorus compound is very effective for improving heat stability of the aliphatic polyester carbonates.

EXAMPLES 3–4

The reaction of Example 1 was carried out in the same manner as in Example 1 with changing the kind of catalyst and the time of addition. The results are shown in Table 2. It can be seen from Table 2 that a high reaction rate can be obtained by using the two kinds of the catalysts of the present invention irrespective of the time of the addition of the catalysts.

COMPARATIVE EXAMPLE 1–2

The reaction of Example 1 was carried out in the same manner as in Example 1 with changing the kind of catalyst, the number of catalyst and the time of addition. The results are shown in Table 2. It can be seen from Table 2 that a sufficient reaction rate cannot be obtained by using only one kind of the catalyst.

EXAMPLES 5–6 AND COMPARATIVE EXAMPLE 3

In the same manner as in Example 1, aliphatic polyester carbonates containing respectively 7.1% and 20.7% of carbonate unit were prepared. For comparison, under the same conditions of preparation of oligomer as in Example 1, an aliphatic polyester having a weight-average molecular weight of 120,000 was prepared by carrying out the reaction for 9 hours with addition of 6000 ppm of zirconiumacetylacetate.

TEST EXAMPLES 1–4

Sheets having a thickness of 150 μm were produced using the aliphatic polyester carbonates prepared in Examples 1, 5 and 6 and the aliphatic polyester prepared in Comparative Example 3. These sheets were subjected to a soil burial test under the conditions of 25° C. and 60% RH. The test was conducted in the following manner. A sample of 20×90 mm was cut out from each of the sheets and buried in soil at a depth of 5 cm from the surface. The aliphatic polyester carbonate samples disappeared or underwent a change such as formation of holes due to degradation in 18 weeks of the test. Change in weight of the samples is shown in Table 3.

It can be seen that the biodegradability is improved with increase in the amount of carbonate component and the aliphatic polyester carbonates are superior in biodegradability to polyesters containing no carbonate.

COMPARATIVE EXAMPLE 4

In the same 50 liter reactor as used in Example 1 were charged 18720 g (158.5 mols) of succinic acid, 21430 g (237.8 mols) of 1,4-butanediol and 700 mg of zirconium acetylacetonate, and reaction was carried out in a nitrogen atmosphere at 150°–220° C. for 2 hours and water was distilled off. Subsequently, the degree of reduction of pressure was gradually increased so as to reach finally 3 mmHg or lower to further distill off water and 1,4-butanediol over a period of 2.5 hours. The resulting prepolymer had a number-average molecular weight of 1300, a terminal hydroxyl value of 158 KOH mg/g and a somewhat high acid value of 2.96 KOH mg/g. Amount of the remaining 1,4-butanediol was 1.2% by weight.

Then, 24,000 g of the resulting prepolymer was charged in the same 50 liter reactor as used in Example 1 and 7250 g of diphenyl carbonate and 1.2 g of zinc acetylacetonate were added thereto. Reaction was carried out at 210°–220° C. for 6.5 hours under a reduced pressure of finally 1 mmHg. A polymer was obtained, but it had a weight-average molecular weight (Mw) of 101,000 measured by GPC and was inferior in polymerization degree to the polymer obtained in Example 1, and a film made therefrom was difficult to perform biaxial stretching. Furthermore, the polymer obtained was more colored than the polymer obtained in Example 1.

COMPARATIVE EXAMPLE 5

In the same 50 liter reactor as used in Example 1 were charged 18740 g (158.7 mols) of succinic acid, 21430 g (237.8 mols) of 1,4-butanediol and 690 mg of zirconium acetylacetonate and reaction was carried out in a nitrogen atmosphere at 150°–220° C. for 2 hours and water was distilled off. Subsequently, with keeping the temperature at 220° C., 1,4-butanediol was distilled off under 50 mmHg for 30 minutes and thereafter under a reduced pressure of 10 mmHg and the reaction was stopped when the total distillation amount reached 7600 g. The resulting oligomer had a number-average molecular weight of 1020, a terminal hydroxyl value of 207 KOH mg/g and an acid value of 1.0 KOH mg/g. Amount of 1,4-butanediol in the oligomer was somewhat large, namely, 2.23% by weight.

Then, 24,000 g of the resulting oligomer was charged in the same reactor as used in Example 1 and 9500 g of diphenyl carbonate and 1.2 g of zinc acetate were added thereto. Reaction was carried out at 220°–230° C. for 5 hours under a reduced pressure of finally 1 mmHg. The resulting polymer had a weight-average molecular weight (Mw) of 175000 measured by GPC and had a high polymerization degree as in Example 1. However, amount of the carbonate component was 20.8% and loss of diphenyl carbonate was 14.9% by weight.

EXAMPLE 7

In the same reactor as used in Example 1 were charged 18740 g (158.7 mols) of succinic acid, 18560 g (206.0 mols) of 1,4-butanediol, 3760 g (31.8 mols) of hexamethylene glycol and 730 mg of zirconium acetylacetonate and reaction was carried out in a nitrogen atmosphere at 150°–220° C. for 2 hours and water was distilled off. Subsequently, the degree of reduction of pressure was gradually increased so as to reach finally 2 mmHg or lower to further distill off water and 1,4-butanediol. The reaction was stopped when the total distillation amount reached 9900 g. The resulting oligomer had a number-average molecular weight of 1400, a terminal hydroxyl value of 120 KOH mg/g and an acid value of 1.69 KOH mg/g. Amount of the remaining 1,4-butanediol was 0.68% by weight.

Then, 24,000 g of the resulting oligomer was charged in the same reactor as used in Example 1 and 5400 g of diphenyl carbonate and 1.2 g of zinc acetate were added thereto. Reaction was carried out at 220°–230° C. for 5 hours under a reduced pressure of finally 1 mmHg. The resulting polymer had a weight-average molecular weight (Mw) of 210,000 measured by GPC and contained 16.6% of carbonate bond as polycarbonate component measured by $^{13}$CNMR and had a melting point of 97.8° C. Loss of diphenyl carbonate was 3.7% by weight.

EXAMPLE 8

In the same reactor as used in Example 1 were charged 16840 g (142.6 mols) of succinic acid, 2320 g (15.9 mols) of adipic acid, 21430 g (237.8 mols) of 1,4-butanediol and 750 mg of zirconium acetylacetonate and reaction was carried out at 150°–220° C. for 2 hours in a nitrogen atmosphere and water was distilled off. Subsequently, the degree of reduction of pressure was gradually increased so as to reach finally 2 mmHg or lower to further distill off water and 1,4-butanediol. The reaction was stopped when the total distillation amount reached 10330 g. The resulting oligomer had a number-average molecular weight of 1800, a terminal hydroxyl value of 105 KOH mg/g and an acid value of 0.69 KOH mg/g. Amount of the remaining 1,4-butanediol was 0.72% by weight.

Then, 24,000 g of the resulting oligomer was charged in the same reactor as used in Example 1 and 4810 g of diphenyl carbonate and 1.5 g of zinc acetylacetonate were added thereto. Reaction was carried out at 220°–230° C. for 5 hours under a reduced pressure of finally 1 mmHg. The resulting polymer had a weight-average molecular weight (Mw) of 180,000 measured by GPC and a melting point of 84.4° C. and contained 14.7% of carbonate bond as polycarbonate unit measured by $^{13}$CNMR. Loss of diphenyl carbonate was 4.1% by weight.

TABLE 1

| | Properties of film | | |
|---|---|---|---|
| | | | Example 1 |
| Melt viscosity | poise | | 9800 |
| Modulus of elasticity | GPa | MD | 0.19 |
| | | TD | 0.22 |
| Yield strength | MPa | MD | 22.8 |
| | | TD | 22.1 |
| Maximum strength | MPa | MD | 91.8 |
| | | TD | 89.4 |
| Elongation | % | MD | 690 |
| | | TD | 800 |

Melt viscosity: at 190° C., and under a load of 60 kg
MD: Machine direction
TD: Transverse perpendicular to MD

TABLE 2

Comparison on kind of catalyst, amount of catalyst and time of addition of catalyst

|  |  | Example 1 | Example 3 | Example 4 | Comparative Example 1 | Comparative Example 2 |
|---|---|---|---|---|---|---|
| The first step | | | | | | |
| Catalyst 1 | | Zr(acac)$_4$ | Zr(acac)$_4$ | Hafnium acetylacetonate | Zr(acac)$_4$ | Zinc acetate |
| (g) | | (0.745) | (0.740) | (0.680) | (2.0000) | (2.000) |
| Catalyst 2 | | — | Zn(acac)$_2$ | — | — | — |
| (g) | | | (1.500) | | | |
| Acid value | | 0.51 | 0.58 | 0.57 | 0.50 | 3.40 |
| The second step | | | | | | |
| Catalyst | | Zinc acetate | — | Dibutyltin laurate | — | — |
| (g) | | (1.400) | | (1.020) | | |
| Weight-average molecular weight | Mw | 188000 | 182000 | 184000 | 81000 | 110000 |
| Loss of DPC | wt % | 3.2 | 3.1 | 2.9 | 13.1 | 9.8 |
| Reaction time | h | 5.0 | 5.0 | 5.0 | 7.0 | 7.0 |

Zr(acac)$_4$: Zirconium acetylacetonate, Zn(acac)$_2$: Zinc acetylacetonate
Loss of DPC: Loss of diphenyl carbonate due to side reaction

TABLE 3

Results of soil burial test

|  | Test Example 1 | Test Example 2 | Test Example 3 | Test Example 4 |
|---|---|---|---|---|
| Preparation example of polymer | Example 1 | Example 5 | Example 6 | Comparative Example 3 |
| Content of carbonate unit (%) | 14.3 | 7.1 | 20.7 | 0 |
| Weight-average molecular weight | 188000 | 183000 | 189000 | 12000 |
| Decrease in weight (%) | | | | |
| After 3 weeks | 10 | 4 | 18 | 3 |
| After 6 weeks | 17 | 11 | 24 | 10 |
| After 9 weeks | 29 | 23 | 47 | 15 |
| After 12 weeks | 38 | 31 | 70 | 18 |
| After 15 weeks | 52 | 43 | Disappeared | 20 |
| After 18 weeks | 76 | 56 | | 22 |

What is claimed is:

1. A process for producing an aliphatic polyester carbonate having biodegradability which comprises reacting an aliphatic dihydroxy compound with an aliphatic dibasic acid in the presence of an ester exchange catalyst to obtain an aliphatic polyester oligomer having a number-average molecular weight of 10,000 or less and an acid value of 2.5 KOH mg/g or less and containing 2.0% (wt/wt) or less of unreacted aliphatic dihydroxy compound, then, reacting said aliphatic polyester oligomer with a diaryl carbonate in the presence of said ester exchange catalyst to obtain an aliphatic polyester carbonate having a content of carbonate unit of at least 5 mol %, a weight-average molecular weight of at least 100,000, a melt viscosity of 2,000–50,000 poises at 190° C. and under a load of 60 kg and a melting point of 70°–180° C., and adding 0.0005–0.01 part by weight of a phosphorus compound to 100 parts by weight of said aliphatic polyester carbonate.

2. A process according to claim 1, wherein the aliphatic dihydroxy compound is mainly composed of 1,4-butanediol and the aliphatic dibasic acid is mainly composed of succinic acid and the ester exchange catalyst comprises a Zr compound or a Hf compound and at least one compound selected from the group consisting of compounds of Y, La, Zn and Sn.

3. A process according to claim 1, wherein the Zr compound is at least one compound selected from the group consisting of zirconium acetylacetonate, zirconium tetraethoxide, zirconium tetraisopropoxide, zirconium n-butoxide, zirconium tert-butoxide, zirconium chloride, zirconyl chloride, zirconyl sulfate, zirconyl oxyacetate, zirconyl octanoate and zirconium oxystearate.

4. A process according to claim 1, wherein the Hf compound is at least one compound selected from the group consisting of hafnium acetylacetonate, hafnium tetrabutoxide and hafnium tetraisopropoxide.

5. A process according to claim 1, wherein the Y compound is at least one compound selected from the group consisting of yttrium acetate, yttrium naphthenate and tris (acetylacetonato)yttrium.

6. A process according to claim 1, wherein the La compound is lanthanum acetate.

7. A process according to claim 1, wherein the phosphorus compound is at least one compound selected from the group consisting of phosphoric acid, polyphosphoric acid and phosphorous acid and esters thereof.

8. A composition comprising an aliphatic polyester carbonate obtained by the process according to claim 1.

* * * * *